United States Patent Office 3,456,507
Patented July 22, 1969

3,456,507
SAFETY DEVICE FOR CORRECTING INSTRU-
MENTS FOR GASEOUS FLUID METER OF
THE PLUNGING BELL-JAR TYPE
Martial Henri Mathias Muger, Bagneux, France, assignor to Compagnie des Compteurs, Paris, France, a company of France
Filed Sept. 14, 1967, Ser. No. 667,851
Claims priority, application France, Oct. 3, 1966, 78,496
Int. Cl. G01k 1/08
U.S. Cl. 73—345                                   5 Claims

ABSTRACT OF THE DISCLOSURE

A safety device for an instrument for determining the correction factor of a gaseous fluid meter. The instrument has an open bell jar partly immersed in a liquid contained in a sink. There is an enclosure above the sink with the gaseous fluid being measured contained therein. An inner wall interposed between the sink and enclosure has a hole in it with a rod connected vertically to the bell jar and extending through the hole of the inner wall. A valve connected to the rod finds a seat in the opening of the inner wall as the bell jar rises, upward movement of the bell jar being stopped thereby. A means is provided to cause the valve to abruptly seat in the opening.

---

The meters for gaseous fluid volumes integrate volumes of fluid circulating under a given temperature and pressure. If the pressure and the temperature vary in time, this manner of measuring volumes has no practical meaning. Therefore, it is appropriate by way of an instrument for determining a correction factor to restore volumes so measured by the meter to a fixed reference state so that the measures may be comparable to each other.

As set out in my copending application Ser. No. 633,120, the correcting instrument may be of the type comprising a bell jar partly immersed in a nonvolatile liquid, mercury for instance, and the present invention relates to a safety device for this instrument.

It is known that this kind of correcting instrument is based upon the axial compression—under the pressure exerted by the gas in the measuring conditions—of a bell jar enclosing a reference volume of gas, that is, a certain volume of the gas to be measured at fixed reference temperature and pressure.

The movement of the bell jar is guided by a rod, the axial displacement of any point of which corresponds to the variation of the volume occupied by said reference volume under measuring conditions. It is known that the correcting coefficient, by which it is appropriate to multiply the figures of the volume of gas so measured at any temperature and pressure conditions to restore the measuring result to fixed reference temperature and pressure, is inversely proportional to this displacement, so that the correcting coefficient may be known.

The instruments of this type cannot be used with all the desirable safety. When the pressure of the gas, exerted over the bell jar, falls below a certain value, the pressure of the confined gas within the bell jar may become higher than this pressure and the bell jar risks disengagement from the bath, in which event some of this confined gas escapes from the bell jar causing a modification in the mass of the reference volume. It becomes then necessary to proceed to a new calibration of the corrector, which calls for long and delicate operations.

A known solution consists in providing the inlet piping for the gas in the casing with a safety valve whose closing is controlled by a system of levers ensuring the guiding of the rod for a given level of the bell jar. This solution does not provide complete safety since the output axis and shaft have necessarily to pass through the walls of the casing (namely, the transmission shaft allowing to make known the correcting coefficient) which involves, in spite of all the usual cares (greasy packing for example), a risk of leakage which may not prevent disengagement of the bell jar after closing the safety valve.

The invention has for its object to obviate such a disadvantage.

According to the invention, the safety device for correcting instrument of gaseous fluid meter comprises a sink containing a nonvolatile liquid, a bell jar open in its lower part and plunging by this part into the liquid so as to enclose a reference volume of the gaseous fluid to be measured, an enclosure over the sink and which is fed by the fluid in the measuring conditions, a rod firmly fixed to the bell jar and maintaining said bell jar in a vertical position and guiding means for this rod, the device being characterized in that an inner wall is provided between said sink and said enclosure, this inner wall being provided with an opening for the passage of said rod and for the passage of the gas from said enclosure to said sink so that the bell jar be submitted to the pressure and the temperature prevailing in said enclosure and means for limiting the displacement of said bell jar towards said inner wall in such a way that said bell jar is prevented from disengaging from the liquid in which is partly immersed its lower part.

Various other characteristics of the invention will moreover be revealed by the detailed description which follows.

One suitable embodiment of the invention is shown, by way of a nonrestrictive example in the accompanying drawings wherein.

Figure 1:
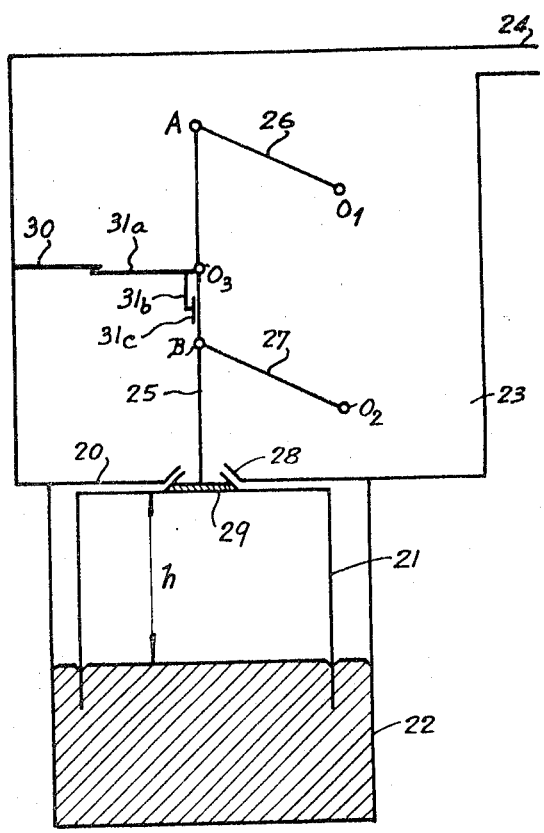
FIGURE 1 is a diagrammatic view of the device of the invention.

In the drawing, reference numeral 21 indicates a bell jar for example cylindrical, the wall of which is partly immersed in a nonvolatile liquid, mercury for example, contained in a sink 22 communicating with an enclosure 23 in which opens a feeding duct 24 for the intake of the gaseous fluid whose values, measured in a meter, have to be corrected for temperature and pressure. The meter pre se, not shown, needs not to be detailed since it is not a part of the invention. Inside the bell jar 21 is initially enclosed a reference volume of the gas in the reference temperature and pressure conditions, the gas being the same as that which flows through duct 24 and being introduced through hollow valve stem 36 and valve 37. In those circumstances, the height between the top of the bell jar and the surface of the mercury is $h$. The bell jar 21 together with the enclosed gas constitutes a thermomanometric container subjected to the same temperature and pressure as the gas to be studied and conducted into the enclosure 23. If, when functioning, the temperature and/or the pressure of the gas to be studied vary, the height $h$ between the liquid and the top of the bell jar varies, and this variation gives an indication depending on the volume occupied by the reference volume in the temperature and pressure conditions of the considered gas.

Maintaining the bell jar 21 in a vertical position is ensured by a rod 25 firmly connected to said bell jar 21 and arranged for displacement longitudinally of its axis. The rod 25 whose displacements constitute a measurement of the variation in the height $h$ is guided by two connecting rods 26 and 27 respectively pivoting around fixed axes $O_1$ and $O_2$. The connecting rods 26 and 27 are also respectively articulated on axes A and B carried by the rod 25 so that the quadrilateral $O_1ABO_2$ is distortable around fixed points $O_1$ and $O_2$ and constitutes guiding means for the rod 25.

The sink 22 and the enclosure 23 are separated by an inner wall 20 with an opening 28 through which passes the rod 25. The edge of the opening is so shaped as to constitute the seat for a valve 29 mounted on said rod 25 above the bell jar 21. On the internal wall of the enclosure 23 is fixed a spring blade 30 cooperating with a two-armed lever 31a and 31b pivoting around a fixed point $O_3$ of rod 25. The arm 31b is provided with a heel 31c.

Figure 2:
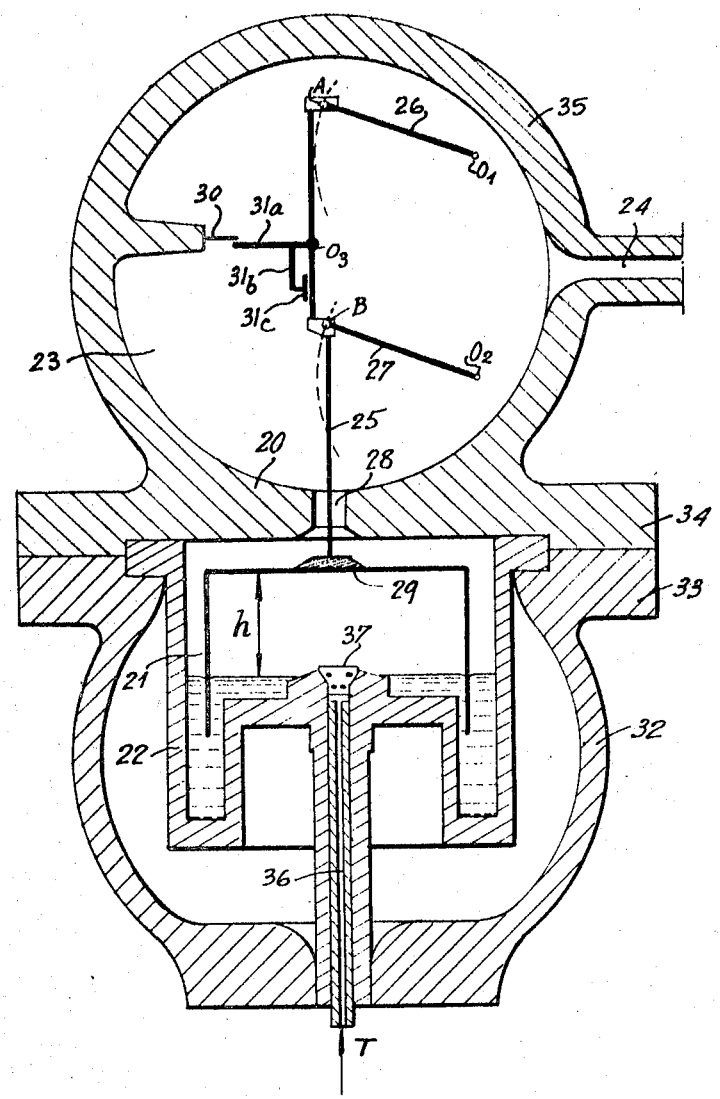
FIGURE 2 is a vertical central sectional view of an actual structural embodiment showing how the concept of the invention may be realized.

FIGURE 2 shows that the sink 22 is advantageously mounted inside protecting casing 32 open on its upper part and provided with a flange 33 on which is fixed the corresponding flange 34 of a second protecting casing 35 defining the enclosure 23. Moreover, the bottom of the sink 22 constitutes a guiding passage for the tubular stem 36 of a valve 37 for introducing the reference gas inside the bell jar 21. Because of this structure, the device may be directly fixed on the meter with which it has to be incorporated.

The device works according to the following way. When the height $h$ reaches a certain and predetermined value, the valve 29 is close to its seat. Upon initial upward movement of rod 25, lever arm 31a encounters the spring blade 30 which bends allowing braking of the rod 25 in its upward movement, while the heel 31c of lever arm 31b, abutting against the rod 25, prevents lever arm 31a from rocking around the point $O_3$. When the spring blade is bent enough, the end of lever arm 31a escapes from the spring blade, and the rod 25 moves abruptly up carrying the valve 29 which is then thrown against its seat of the opening 28. When the rod 25 goes down again, the spring blade 30 does not oppose any resistance to lever arm 31a which rocks around its articulating axis $O_3$.

The device which has been described presents essentially the advantage of complete safety. No disengagement of the bell jar 21 is possible, even when a leakage may occur at the packing provided around rod 25 in opening 28 through the wall of the casing 23. The sink 22 is then completely isolated from said casing by the closing of the valve 29. This closing is ensured in a tightened way thanks to the lever arms 31a and 31b cooperating with the spring blade 30.

One does not go outside the scope of the present invention by substituting for the braking device previously described (spring blade 30, lever arms 31a and 31b, heel 31c) any equivalent device, able to brake the rod 25 in its upward stroke and to abruptly free said rod when the valve 29 comes near by its seat, and without offering any resistance to said rod in its downward stroke.

One does not go also out of the scope of the invention by placing the valve 29 or any equivalent means on the rod 25 at any level, although the disposal of the valve on the top of the bell jar 21, as represented on FIGS. 1 and 2, constitutes the preferred form of the invention.

I claim:
1. In a safety device for determining the correction factor of a gaseous fluid meter comprising a sink containing nonvolatile liquid, a bell jar open in its lower part and plunging by this part into the liquid so as to enclose a reference volume of the gaseous fluid to be measured, an enclosure over the sink and which is fed by the fluid in the measuring conditions, a rod firmly fixed to said bell jar and maintaining said bell jar in a vertical position and guiding means for this rod, the improvement wherein an inner wall is provided between said sink and said enclosure, said inner wall being provided with an opening for the passage of said rod and for the passage of the gas from said enclosure to said sink so that said bell jar is subjected to the pressure and the temperature prevailing in said enclosure, and means for limiting the displacement of said bell jar towards said inner wall in such a way that said bell jar is prevented from disengaging from the liquid in which its lower part is immersed.

2. Safety device according to claim 1 in which said inner wall constitutes a valve seat and said rod supports a valve brought against said seat when said bell jar is displaced towards the inner wall, said valve closing said opening to isolate said enclosure from said sink while the lower part of the bell jar is still immersed in the liquid.

3. Safety device according to claim 2 and which further comprises a fast triggering unidirectional brake associated with said enclosure so that said valve is prevented from engaging its seat as long as an adequate effort is not yet produced by the bell jar in the direction of its displacement towards the inner wall, said brake having no effect in the other direction of movement of said bell jar.

4. Safety device according to claim 3 in which said brake comprises a spring blade connected to said enclosure and protruding towards said rod, a pivoting lever rotatably mounted on said rod and intercepting said spring blade and a heel part firmly fixed on the end of said lever for abutting on said rod so that said lever can only pivot in one direction.

5. Safety device according to claim 1 and which further comprises a protecting casing surrounding said sink and firmly fixed on said enclosure, a tubular stem passing through said casing and said sink to protrude inside the ball jar over the level of the liquid which is contained in the sink and a closing valve for said tubular stem so that the quantity of gaseous fluid enclosed in said bell jar may be regulated by operating this valve.

References Cited

UNITED STATES PATENTS 1,422,089   7/1922   Dezendorf _____ 73—3

LOUIS R. PRINCE, Primary Examiner

DENIS E. CORR, Assistant Examiner

U.S. Cl. X.R.

73—194, 232, 262, 389